G. M. EATON.
ELECTRIC LOCOMOTIVE.
APPLICATION FILED JUNE 9, 1919.
1,365,310.
Patented Jan. 11, 1921.
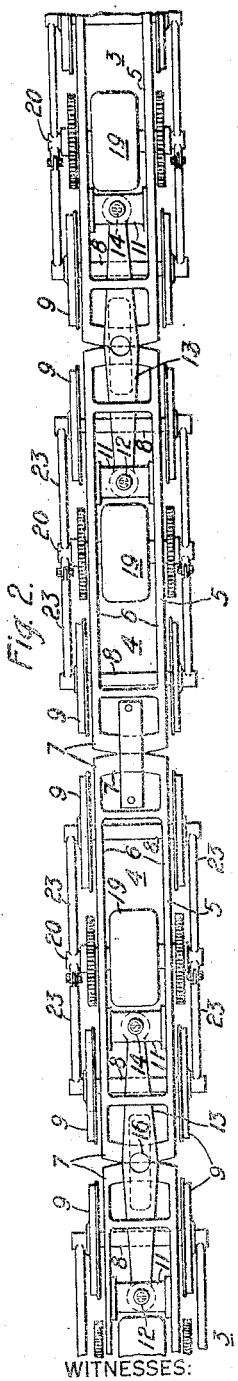
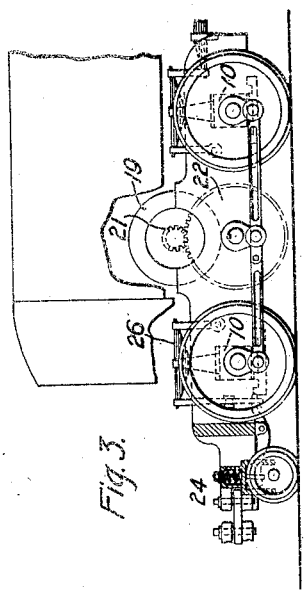
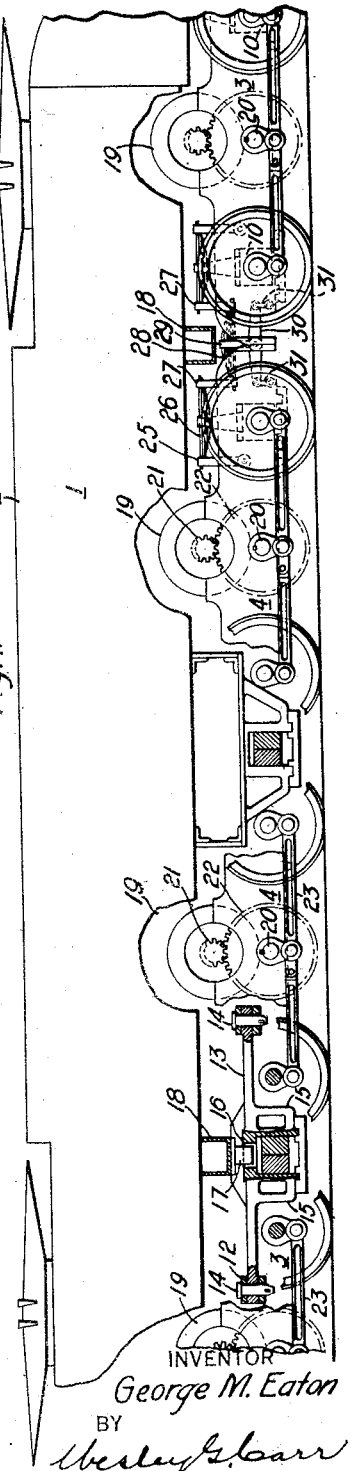
WITNESSES:
H. T. Shelhamer
H. M. Biebel
INVENTOR
George M. Eaton
BY
Wesley G. Carr
ATTORNEY

UNITED STATES PATENT OFFICE.

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRIC LOCOMOTIVE.

1,365,310. Specification of Letters Patent. Patented Jan. 11, 1921.

Application filed June 9, 1919. Serial No. 302,753.

*To all whom it may concern:*

Be it known that I, GEORGE M. EATON, a citizen of the United States, and a resident of Pittsburgh, in the county of Allegheny and State of Pennsylvania, have invented a new and useful Improvement in Electric Locomotives, of which the following is a specification.

My invention relates to electrically-propelled vehicles and particularly to electric locomotives.

One object of my invention is to provide a locomotive having a plurality of articulated trucks and one cab extending over the entire set of trucks.

Another object of my invention is to provide a locomotive of the above-mentioned type that shall have good tracking characteristics and the entry of which into curves will be very easy.

Another object of my invention is to so arrange a locomotive of the above type as to effect the lateral guiding of each end of the cab from two associated trucks and to distribute the lateral cab-guiding stresses over the two associated trucks.

In order to reduce the stresses, due to the driving motors in large heavy-duty electric locomotives, it is desirable to employ a plurality of motors and of associated trucks, and, when four trucks are located under one cab, it is desirable that each end of the cab be guided laterally at a point intermediate the two outer trucks. The proper articulation of the trucks, in such a locomotive, is a difficult problem, and my invention discloses one solution thereof.

In practising my invention, I provide a plurality of articulated outer and inner rigid-wheel-base trucks, the outer trucks being provided with two-wheel pony trucks. Each main truck embodies two pairs of main driving wheels, a jack shaft connected, by means of side rods, to the main driving wheels, and driving motors operatively connected to the jack shaft. The preferred articulation of the associated inner trucks is that shown in Patent 1,133,971, issued on March 30, 1915 to Mr. W. F. Kiesel, Jr. The articulation of the associated outer and inner trucks is effected by means of a truck-articulation link which is connected to both truck frames and acts also as a cab-guiding equalizer. The cab center pin, at each end of the cab, is located over the articulation of the two associated trucks, and the weight of the cab is spring-borne by, and distributed over, the individual truck frames. The adjacent driving wheels of abutting trucks are equalized, together using an essentially 3-point equalization.

Figure 1, of the drawing, is a side view of the apparatus embodying my invention, with certain parts cut away, and other parts shown in cross section; Fig. 2 is a top plan view of the running gear; Fig. 3 is a side view of the front end of the locomotive, with certain parts shown in cross section.

Referring to Fig. 1, a locomotive 1 embodies a single cab 2, two outer trucks 3 and two inner trucks 4. Each truck comprises a truck frame 5 having side members 6 and bumper girders 7, two axles 8 in journals 10 having a limited vertical movement with respect to the frames 5, and associated driving wheels 9. Inasmuch as the abutting ends of the trucks 4 are articulated according to the method disclosed in Patent 1,133,971, dated March 30, 1915, issued to William F. Kiesel, Jr., a detailed description thereof is believed to be unnecessary.

A cross member 11 is suitably secured to the side frames 6 of each truck near the adjoining ends of abutting outer and inner trucks, and is provided, at its mid length, with a circular opening 12. A floating link 13 is pivotally connected to the two cross members 11 of abutting outer and inner trucks 3 and 4 by means of pins 14 located at each end of the link 13 and at the mid length of cross member 11. The link 13 has two downwardly extending flanges 15 near its mid portion that surround, with working clearances, the truck bumper girders 7 of abutting outer and inner trucks. At its upper surface and at its mid length, link 13 is provided with a circular opening 16 in which is located a cab center pin 17. The cab center pin 17 is carried on a cab cross tie 18 suitably fastened to the under side of the cab 2. The opening 16 is larger in diameter than the coöperating pin 17 to allow the cab to adjust itself to the various longitudinal positions of the trucks, under all conditions of operation. The weight of the cab 2 is carried on the truck frames by means of spring-loaded friction plates (not shown) in the usual manner.

Driving motors 19 are shown as being operatively connected to jack shafts 20 by means of pinions 21 and gears 22, and the driving effort of the motor is transmitted from the jack shaft 20 to its associated driving wheels 9 by means of connecting rods 23. The outer trucks 3 comprise, in addition to the main driving wheels and axles, a 2-wheel pony truck of a standard type and construction.

Referring to Fig. 3, the guiding truck 24 is equalized with the adjacent pair of main driving wheels by a system of links and springs, in general, the same as that used on the corresponding parts of steam locomotives, of the Consolidation type.

The system of equalization between adjacent driving wheels of abutting outer and inner trucks, is as follows: a link 25 is pivotally connected to the side frame 6 between the two main driving wheels of each truck at a point near the adjacent wheels of abutting trucks. A semi-elliptic spring 26, pivotally mounted on the journal 10, engages the link 26 at one of its ends and also engages a link 27 at its other end. The two links 27 carry a suspended semi-elliptic spring 28 which, at its mid length, supports a suspended link 29. The link 29 is pivotally connected to an equalizing bar 30 at its mid length. At each end of the bar 30 is suspended a link 31, each of which is pivotally connected, at its lower end, to the side frame 6.

The equalization between the two inner trucks 4 is practically the same as that described above, except that the trucks are cross equalized and, as cross-equalization is an established art, a detail description thereof appears unnecessary. In this way, the four associated trucks are equalized with three 3-point systems of equalization for all four trucks.

While I have shown a specific application of my invention, many changes may be made therein without departing from the spirit and scope of my invention, and I desire, therefore, that only such limitations shall be placed thereon as are imposed by the prior art or are specifically set forth in the appended claims.

I claim as my invention:

1. In a locomotive structure, the combination with a cab, of a plurality of articulated inner and outer trucks associated therewith, each outer truck comprising two pairs of main driving wheels and one pair of guiding truck wheels and each inner truck comprising two pair of main driving wheels.

2. In a locomotive structure, the combination with a cab, of a plurality of articulated outer and inner trucks associated therewith, each truck comprising two pairs of main driving wheels, a jack shaft, propelling means operatively connected to each jack shaft and means for communicating the motion of the jack shaft to the main driving wheels.

3. In a locomotive structure, the combination with a cab, of a plurality of articulated inner and outer rigid-wheel-base trucks associated therewith, each truck comprising two pairs of main driving wheels, a jack shaft, propelling means operatively connected to each jack shaft and means for operatively connecting each jack shaft to its associated driving wheels.

4. In a locomotive structure, the combination with four articulated main trucks, each having two pairs of driving wheels, a jack shaft, propelling means operatively connected to the jack shaft, and means for communicating the motion of the jack shaft to the driving wheels, of a single cab extending over the four sets of main trucks.

5. In a locomotive structure, the combination with a cab, of a plurality of articulated outer and inner trucks associated therewith, and means for longitudinally restraining the cab by the inner trucks.

6. In a locomotive structure, the combination with a cab, of a plurality of articulated outer and inner trucks associated therewith, and means for laterally restraining the cap by the outer ends of the inner trucks.

7. In a locomotive structure, the combination with a cab, of a plurality of articulated outer and inner trucks associated therewith, and means for locating the cab center pins over the articulation of two trucks.

8. In a locomotive structure, the combination with a cab and a plurality of supporting trucks therefor disposed entirely beneath said cab, of means for locating the cab center pins outside of the wheel base of any truck.

9. In a locomotive structure, the combination with a cap, of a plurality of articulated outer and inner trucks associated therewith, and means for laterally restraining the cab by the inner trucks.

10. In a locomotive structure, the combination with a cab, of a plurality of articulated outer and inner trucks associated therewith, and means to distribute the guiding of each end of the cab over two associated trucks.

11. In a locomotive structure, the combination with a cab and a plurality of articulated outer and inner trucks associated with said cab, of means constituting a combined cab-guiding equalizer and truck-articulation link for associated outer and inner trucks.

12. In a locomotive structure, the combination with a cab, and a plurality of outer and inner trucks associated with said cab, each truck comprising a plurality of pairs of driving wheels, of means for equalizing the adjacent driving wheels of abutting trucks.

13. In a locomotive structure, the combination of a cab, a plurality of trucks therefor, and an equalizing and supporting member connected to a pair of trucks within the wheel bases thereof and connected to said cab without the wheel bases of any of said trucks.

In testimony whereof, I have hereunto subscribed my name this 27th day of May 1919.

GEORGE M. EATON.

Corrections in Letters Patent No. 1,365,310.

It is hereby certified that in Letters Patent No. 1,365,310, granted January 11, 1921, upon the application of George M. Eaton, of Pittsburgh, Pennsylvania, for an improvement in "Electric Locomotives," errors appear in the printed specification requiring correction as follows: Page 2, line 57, claim 1, for the word "pair" read *pairs;* same page, lines 94 and 109, claims 6 and 9, for the word "cap" read *cab;* and that the said Letters Patent should be read with these corrections therein that the same may conform to the record of the case in the Patent Office.

Signed and sealed this 22d day of February, A. D., 1921.

[SEAL.]

L. B. MANN,

*Acting Commissioner of Patents.*

Cl. 105—175.